(12) United States Patent
Suzuki et al.

(10) Patent No.: US 7,195,837 B2
(45) Date of Patent: Mar. 27, 2007

(54) SEPARATOR UNIT AND FUEL CELL WITH SEPARATOR UNIT

(75) Inventors: Masaharu Suzuki, Tochigi-Ken (JP); Naoyuki Enjoji, Tochigi-Ken (JP); Yuichiro Kosaka, Tochigi-Ken (JP); Narutoshi Sugita, Tochigi-Ken (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 507 days.

(21) Appl. No.: 10/439,907

(22) Filed: May 16, 2003

(65) Prior Publication Data
US 2003/0215695 A1 Nov. 20, 2003

(30) Foreign Application Priority Data
May 17, 2002 (JP) .............................. 2002-143329

(51) Int. Cl.
*H01M 2/00* (2006.01)
*H01M 2/02* (2006.01)
*H01M 2/14* (2006.01)

(52) U.S. Cl. .............................. 429/34; 429/38; 429/39
(58) Field of Classification Search .................... None
See application file for complete search history.

(56) References Cited

U.S. PATENT DOCUMENTS 4,037,023 A * 7/1977 Grehier et al. ................. 429/12

5,922,485 A * 7/1999 Enami .......................... 429/26

FOREIGN PATENT DOCUMENTS

| DE | 19602315 C2 | 10/2001 |
|---|---|---|
| EP | 0978891 A2 | 2/2000 |
| EP | 1047143 A2 | 10/2000 |
| JP | 06275284 | 9/1994 |
| JP | 07153472 | 6/1995 |
| JP | 2002100381 | 4/2002 |
| WO | WO-03/050905 A2 | 6/2003 |

* cited by examiner

*Primary Examiner*—Patrick Joseph Ryan
*Assistant Examiner*—Julian Mercado
(74) *Attorney, Agent, or Firm*—Lahive & Cockfield, LLP; Anthony A. Laurentano, Esq.

(57) ABSTRACT

A first separator of a unit cell and a second separator of another unit cell and are disposed adjacent to each other in a stacked assembly. Crest surfaces of straight sections of first hollow ridges of the first separator are in contact with crest surfaces of second hollow ridges of the second separator, and crest surfaces of bent sections of the first hollow ridges are spaced from crest surfaces of the second hollow ridges. The spaced crest surfaces allow first troughs of the first separator and second troughs of the second separator to communicate with each other, providing communication passages between the first separator and the second separator. Cooling water is passed through the communication passages.

12 Claims, 16 Drawing Sheets

(Prior Art)

(Prior Art)

(Prior Art)

(Prior Art)

(Prior Art)

SEPARATOR UNIT AND FUEL CELL WITH SEPARATOR UNIT

BACKGROUND OF THE INVENTION

1. Field of the Invention

The present invention relates to a separator unit and a fuel cell having a separator unit, and more particularly to a separator unit which is light in weight and small in size and is capable of guiding a coolant such as cooling water to flow along its surface, and a fuel cell having such a separator unit.

2. Description of the Related Art

FIG. 12 of the accompanying drawings shows in exploded perspective a pair of unit cells 2 of a typical fuel cell 1. As shown in FIG. 12, the fuel cell 1 has a stacked assembly 3 comprising a plurality of unit cells 2 electrically connected in series with each other and stacked in the direction indicated by an arrow A in FIG. 12.

Each of the unit cells 2 comprises an electrolyte electrode assembly 7 made up of an anode electrode 4, a cathode electrode 5, and an electrolyte layer 6 interposed between the anode electrode 4 and the cathode electrode 5, and first and second separators 9, 10 of metal sandwiching a gasket 8 which accommodates and holds the electrolyte electrode assembly 7.

Each of the anode electrode 4 and the cathode electrode 5 has a gas diffusion layer (not shown) made of carbon cloth or the like and an electrode catalyst layer (not shown) made of porous carbon particles carrying a platinum alloy on their surfaces and deposited uniformly on the surface of the gas diffusion layer. The anode electrode 4 and the cathode electrode 5 are electrolyte electrode to the electrolyte layer 6 with their electrode catalyst layers facing each other across the electrolyte layer 6. The electrolyte layer 6 comprises a solid polymer ion exchange membrane in the form of a thin membrane of perfluorosulfonic acid impregnated with water.

Each of the first separator 9, the second separator 10, and the gasket 8 has a first gas inlet passage 11 defined in an upper left corner thereof for passing a fuel gas therethrough and a first gas outlet passage 12 defined in a lower right corner thereof, diagonally opposite to the upper left corner, for passing a fuel gas that has been used therethrough. Similarly, each of the first separator 9, the second separator 10, and the gasket 8 has a second gas inlet passage 13 defined in an upper right corner thereof for passing an oxygen-containing gas therethrough and a second gas outlet passage 14 defined in a lower left corner thereof, diagonally opposite to the upper right corner, for passing therethrough an oxygen-containing gas that has been used and water (water vapor) generated by an electric power generating reaction in the fuel cell 1.

The first separator 9 has a plurality of first hollow ridges 15 on a surface thereof which faces the anode electrode 4, for supplying and discharging the fuel gas (e.g., a hydrogen-containing gas mainly composed of hydrogen) to and from the anode electrode 4. The second separator 10 has a plurality of second hollow ridges 16 on a surface thereof which faces the cathode electrode 5, for supplying and discharging the oxygen-containing gas (e.g., air) to and from the cathode electrode 5. A branch groove 17 and a collection groove 18 are defined between the first hollow ridges 15, the first gas inlet passage 11, and the first gas outlet passage 12. Similarly, a branch groove 19 and a collection groove 20 are defined between the second hollow ridges 16, the second gas inlet passage 13, and the second gas outlet passage 14.

FIG. 13 of the accompanying drawings shows in enlarged fragmentary cross section two unit cells 2 that are stacked together. As shown in FIG. 13, the first hollow ridges 15 and the second hollow ridges 16 are successively arranged with first troughs 21 and second troughs 22, respectively, interposed therebetween. In the stacked assembly 3, the first hollow ridges 15 of the first separator 9 of the upper unit cell 2 in FIG. 12 and the second hollow ridges 16 of the second separator 10 of the lower unit cell 2 have respective crest surfaces held in abutment against each other.

As shown in FIG. 12, each of the first separator 9, the second separator 10, and the gasket 8 has a cooling water inlet passage 23 defined in a lower edge thereof and extending in the direction indicated by an arrow B from the second gas outlet passage 14 to the first gas outlet passage 12. Each of the first separator 9, the second separator 10, and the gasket 8 also has a cooling water outlet passage 24 defined in an upper edge thereof and extending in the direction indicated by the arrow B from the first gas inlet passage 11 to the first gas inlet passage 13.

For operating the fuel cell 1 thus constructed, the fuel gas and the oxygen-containing gas are supplied to the fuel cell 1 respectively through the first gas inlet passage 11 and the first gas inlet passage 13. These supplied gases are distributed by the branch grooves 17, 19 into the first hollow ridges 15 and the second hollow ridges 16 and supplied for reaction over the electrode catalyst layers of the anode electrode 4 and the cathode electrode 5. Unreacted gases are collected by the collection grooves 18, 19, and discharged through the first gas outlet passage 12 and the second gas outlet passage 14.

When the fuel cell 1 is in operation, a coolant, typically cooling water, is also introduced into the cooling water inlet passages 23. The introduced cooling water flows in the stacking direction of the stacked assembly 3, and is then discharged out of the fuel cell 1 through the cooling water outlet passages 24.

For efficiently cooling the unit cells 2, it is preferable to pass the cooling water in the direction indicated by an arrow C in FIG. 12 perpendicular to the stacking direction of the stacked assembly 3, as well as in the stacking direction (indicated by the arrow A) of the stacked assembly 3. One approach would be to pass the cooling water in the plane of the first separator 9 and the second separator 10 from the cooling water inlet passages 23 to the cooling water outlet passages 24.

However, since the first hollow ridges 15 of the first separator 9 of the upper unit cell 2 in FIG. 12 and the second hollow ridges 16 of the second separator 10 of the lower unit cell 2 have their crest surfaces held in abutment against each other, the abutting crest surfaces would present an obstacle to the flow of the cooling water. Therefore, the cooling water cannot be passed in the direction indicated by the arrow C in FIG. 12.

One solution is to place a bar-shaped spacer 25 between the first separator 9 and the second separator 10, as shown in FIG. 14 of the accompanying drawings, spacing the crest surfaces of the first hollow ridges 15 and the second hollow ridges 16 from each other. This proposal, however, is disadvantageous in that the fuel cell 1 is constructed of an increased number of components and has its weight and volume increased by the added spacers 25.

According to another solution shown in FIGS. 15 and 16 of the accompanying drawings, the cooling water inlet passage 23 to the cooling water outlet passage 24 are lined up with the first gas inlet passage 11 and the second gas outlet passage 14, and the first gas outlet passage 12 and the second gas inlet passage 13, for passing the cooling water longitudinally or diagonally in the stacked assembly 3.

However, since the structures shown in FIGS. 15 and 16 fail to distribute the cooling water well in the stacked assembly 3, air bubbles introduced into the cooling water cannot be eliminated, resulting in a reduction in the cooling efficiency. Furthermore, the passages 11, 12, 13, 14, 23, 24 are reduced in size, making it difficult to pass the fuel gas and the oxygen-containing gas at a high rate, with the result that the fuel cell 1 has its power generating efficiency lowered. In addition, it is difficult to change the positions of the passages 11, 12, 13, 14, 23, 24. Stated otherwise, the layout of the passages 11, 12, 13, 14, 23, 24 suffers limited freedom.

SUMMARY OF THE INVENTION

It is a major object of the present invention to provide a separator unit which is light in weight and small in size, allows a fuel cell combined therewith to be cooled efficiently, and enables the fuel cell to generate electric power with a desired level of efficiency, and a fuel cell having such a separator unit.

To achieve the above object, there is provided in accordance with the present invention a fuel cell comprising a stacked assembly having a plurality of stacked unit cells each having an electrolyte electrode assembly comprising an anode electrode, a cathode electrode, and an electrolyte layer interposed between the anode electrode and the cathode electrode, and first and second separators sandwiching the electrolyte electrode assembly, the first separator having hollow spaces for passing therethrough a fuel gas supplied to the anode electrode and a plurality of elongate first hollow ridges with first troughs interposed therebetween, the second separator having hollow spaces for passing therethrough an oxygen-containing gas supplied to the anode electrode and a plurality of elongate second hollow ridges with second troughs interposed therebetween, the second hollow ridges extending in the same direction as the first hollow ridges, at least one of the first hollow ridges or the second hollow ridges having bent sections bent across the direction in which the fuel gas or the oxygen-containing gas flows, to space portions of crest surfaces of the first hollow ridges and crest surfaces of the second hollow ridges from each other, and the crest surfaces of the first hollow ridges and the crest surfaces of the second hollow ridges face each other and are disposed adjacent to each other between the electrolyte electrode assemblies of the stacked assembly, the first troughs and the second troughs communicating with each other through the spaced portions of the crest surfaces of the first hollow ridges and the crest surfaces of the second hollow ridges, so that a coolant can flow through the first troughs and the second troughs which communicate with each other.

With the above arrangement, cooling water can be passed through the stacked assembly without spacers interposed between adjacent unit cells in the stacked assembly. Therefore, the weight and volume of the fuel cell are not increased. The fuel cell is thus light in weight and small in size, and has high cooling efficiency.

Air bubbles introduced into the cooling water can easily be eliminated, so that the cooling efficiency is prevented from being lowered.

As coolant passages are not required to be lined up with gas passages, these passages do not need to be reduced in dimensions. As a result, the rates at which the fuel gas and the oxygen-containing gas flow are not lowered, thus allowing the fuel cell to have a desired level of power generating efficiency. The layout of the passages also has desired freedom.

The first hollow ridges and the second hollow ridges are not limited to any shapes insofar as they are shaped to allow the first and second troughs that communicate with each other to provide the communication passages. According to a preferred example, both the first hollow ridges and the second hollow ridges have bent sections, the bent sections of the first hollow ridges and the bent sections of the second hollow ridges have the same amplitude as each other, and include adjacent bent sections spaced from each other by the same distance, and the bent sections of the first hollow ridges and the bent sections of the second hollow ridges are positioned out of phase with each other.

The amplitude referred to above represents the distance from the abutting crest surfaces of the first and second hollow ridges to the tops of the bent sections. The phase referred to above represents a repetitive pattern at regular intervals, and the bent sections out of phase with each other refer to the bent sections that are staggered with respect to each other.

Alternatively, both the first hollow ridges and the second hollow ridges may have bent sections, the bent sections of the first hollow ridges and the bent sections of the second hollow ridges may include adjacent bent sections spaced from each other by the same distance, and the bent sections of the first hollow ridges and the bent sections of the second hollow ridges may have different amplitudes.

Further alternatively, both the first hollow ridges and the second hollow ridges may have bent sections, the bent sections of the first hollow ridges and the bent sections of the second hollow ridges may have the same amplitude as each other, either the bent sections of the first hollow ridges or the bent sections of the second hollow ridges may include adjacent bent sections spaced from each other by a first distance, and the other bent sections may include adjacent bent sections spaced from each other by a second distance different from the first distance.

Yet further alternatively, both the first hollow ridges and the second hollow ridges may have bent sections, the bent sections of the first hollow ridges and the bent sections of the second hollow ridges may have different amplitudes, and include adjacent bent sections spaced from each other by different distances.

In any of the above patterns, since the coolant flows through the communication passages, the fuel cell can efficiently be cooled. A single fuel cell may incorporate a combination of the above patterns. For example, a single fuel cell may have a pattern of first and second hollow ridges for supplying the cooling water at a larger rate to those unit cells which require more cooling and another pattern of first and second hollow ridges for supplying the cooling water at a smaller rate to those unit cells which require less cooling.

The bent sections are not limited to sharply bent sections, but may be curved sections. Specifically, at least one of the first hollow ridges and the second hollow ridges may be bent to a sine-wave shape along the direction in which the fuel gas or the oxygen-containing gas flows.

The sine-wave shape refers to a shape comprising a pattern of curved peaks and valleys at regular intervals, e.g., a waveform shape representing the relationship between the sine and angle of a trigonometric function.

According to the present invention, there is also provided a separator unit in a fuel cell having a first unit cell and a second unit cell disposed adjacent thereto, each of the unit cells having an electrolyte electrode assembly comprising an anode electrode, a cathode electrode, and an electrolyte layer interposed between the anode electrode and the cathode electrode, and first and second separators sandwiching the electrolyte electrode assembly, the separator unit comprising the first separator in the first unit cell and the second separator in the first unit cell, the first separator having hollow spaces for passing therethrough a fuel gas supplied to the anode electrode and a plurality of elongate first hollow ridges with first troughs interposed therebetween, the second separator having hollow spaces for passing therethrough an oxygen-containing gas supplied to the anode electrode and a plurality of elongate second hollow ridges with second troughs interposed therebetween, the second hollow ridges extending in the same direction as the first hollow ridges, at least one of the first hollow ridges or the second hollow ridges having bent sections bent across the direction in which the fuel gas or the oxygen-containing gas flows, to space portions of crest surfaces of the first hollow ridges and crest surfaces of the second hollow ridges from each other, and the crest surfaces of the first hollow ridges and the crest surfaces of the second hollow ridges face each other and are disposed adjacent to each other between the electrolyte electrode assemblies of the stacked assembly, the first troughs and the second troughs communicating with each other through the spaced portions of the crest surfaces of the first hollow ridges and the crest surfaces of the second hollow ridges, so that a coolant can flow through the first troughs and the second troughs which communicate with each other.

According to a preferred example, in the above separator unit, both the first hollow ridges and the second hollow ridges have bent sections, the bent sections of the first hollow ridges and the bent sections of the second hollow ridges have the same amplitude as each other, and include adjacent bent sections spaced from each other by the same distance, and the bent sections of the first hollow ridges and the bent sections of the second hollow ridges are positioned out of phase with each other.

According to another preferred example, in the above separator unit, both the first hollow ridges and the second hollow ridges have bent sections, the bent sections of the first hollow ridges and the bent sections of the second hollow ridges include adjacent bent sections spaced from each other by the same distance, and the bent sections of the first hollow ridges and the bent sections of the second hollow ridges have different amplitudes.

According to still another preferred example, in the above separator unit, both the first hollow ridges and the second hollow ridges have bent sections, the bent sections of the first hollow ridges and the bent sections of the second hollow ridges have the same amplitude as each other, either the bent sections of the first hollow ridges or the bent sections of the second hollow ridges include adjacent bent sections spaced from each other by a first distance, and the other bent sections include adjacent bent sections spaced from each other by a second distance different from the first distance.

According to yet still another preferred example, in the above separator unit, both the first hollow ridges and the second hollow ridges have bent sections, the bent sections of the first hollow ridges and the bent sections of the second hollow ridges have different amplitudes, and include adjacent bent sections spaced from each other by different distances.

At least one of the first hollow ridges and the second hollow ridges may be bent to a sine-wave shape along the direction in which the fuel gas or the oxygen-containing gas flows.

The above and other objects, features, and advantages of the present invention will become more apparent from the following description when taken in conjunction with the accompanying drawings in which preferred embodiments of the present invention are shown by way of illustrative example.

DESCRIPTION OF THE PREFERRED EMBODIMENTS

Figure 1:
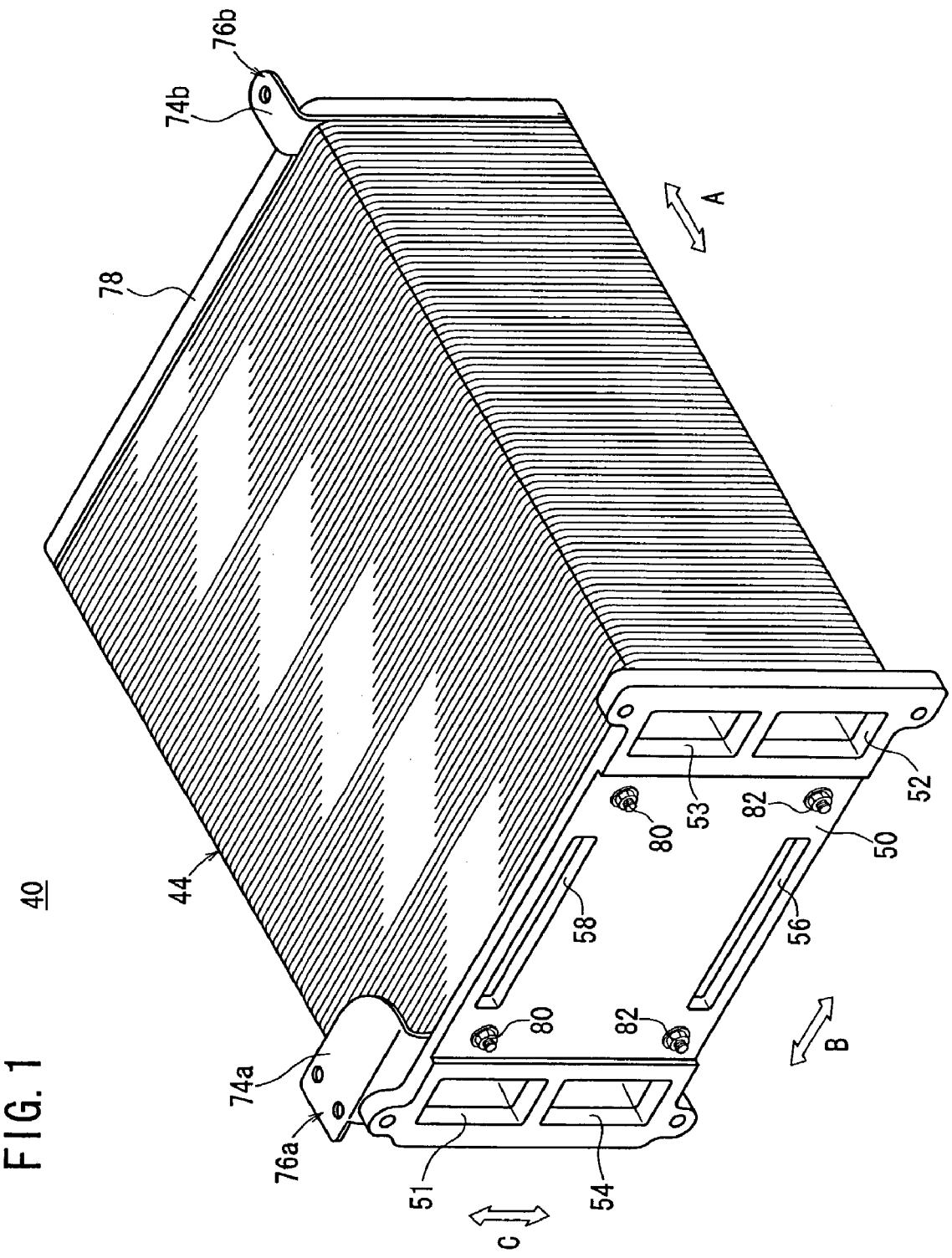
FIG. 1 is a perspective view of a fuel cell according to a first embodiment of the present invention.

Fuel cells according to preferred embodiments of the present invention will be described in detail below with reference to the accompanying drawings. Those parts of the fuel cells according to the preferred embodiments of-the present invention which are identical to those shown in FIGS. 12 through 16 are denoted by identical reference characters, and will not be described in detail below.

FIG. 1 shows in perspective a fuel cell 40 according to a first embodiment of the present invention. The fuel cell 40 has a stacked assembly 44 comprising a plurality of unit cells 42a, 42b shown in FIG. 2 which are electrically connected in series with each other and stacked in the direction indicated by the arrow A in FIG. 1. The unit cells 42a, 42b are structurally identical to each other, but denoted by different reference characters for illustrative purposes.

Figure 2:
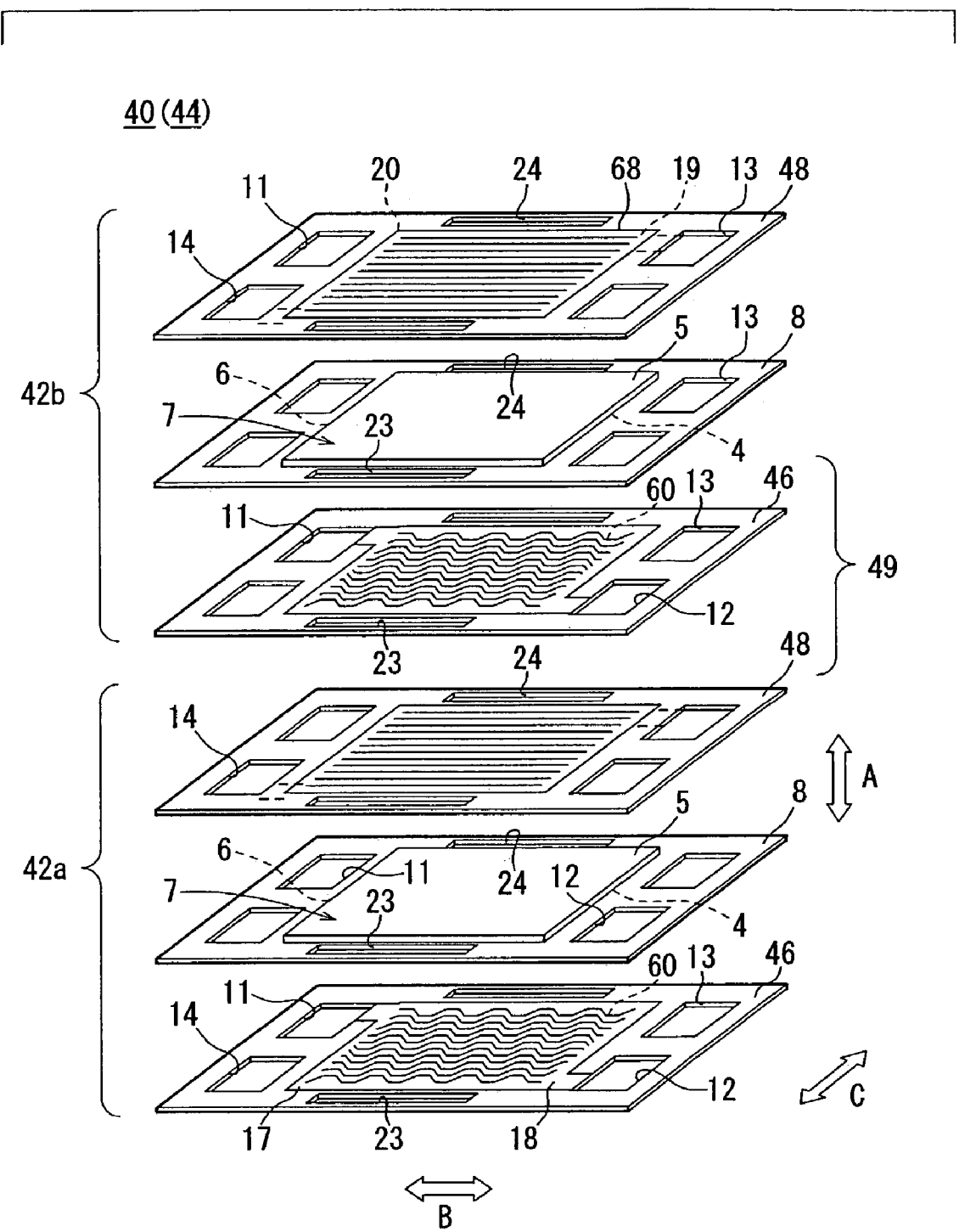
FIG. 2 is an exploded perspective view of two adjacent unit cells in a stacked assembly of the fuel cell shown in FIG. 1.

As shown in FIG. 2, each of the unit cells 42a, 42b comprises an electrolyte electrode assembly 7 made up of an anode electrode 4, a cathode electrode 5, and an electrolyte layer 6 interposed between the anode electrode 4 and the cathode electrode 5, and first and second separators 46, 48 sandwiching a gasket 8 which accommodates and holds the electrolyte electrode assembly 7. In the stacked assembly 44, the second separator 48 of the unit cell 42a and the first separator 46 of the unit cell 42b are positioned adjacent to each other. The second separator 48 and the first separator 46 which are positioned adjacent to each other jointly make up a separator unit 49.

Each of the gasket 8, the first separator 46, and the second separator 48 has a first gas inlet passage 11 defined in an upper left corner thereof for passing a fuel gas therethrough and a first gas outlet passage 12 defined in a lower right corner thereof, diagonally opposite to the upper left corner, for passing a fuel gas that has been used therethrough. Similarly, each of the gasket 8, the first separator 46, and the second separator 48 has a second gas inlet passage 13 defined in an upper right corner thereof for passing an oxygen-containing gas therethrough and a second gas outlet passage 14 defined in a lower left corner thereof, diagonally opposite to the upper right corner, for passing therethrough an oxygen-containing gas that has been used. Each of the gasket 8, the first separator 46, and the second separator 48 also has a cooling water inlet passage 23 defined therein and extending from the second gas outlet passage 14 to the first gas outlet passage 12, and a cooling water outlet passage 24 defined therein and extending from the first gas inlet passage 11 to the first gas inlet passage 13. The cooling water inlet passage 23 and the cooling water outlet passage 24 are formed by connecting holes elongated in the direction indicated by the arrow B.

The first gas inlet passages 11, the second gas inlet passages 13, the first gas outlet passages 12, the second gas outlet passages 14, the cooling water inlet passages 23, and the cooling water outlet passages 24 communicate respectively with a fuel gas supply port 51, a fuel gas discharge port 52, an oxygen-containing gas supply port 53, an oxygen-containing gas discharge port 54, a cooling water supply port 56, and a cooling water discharge port 58 which are defined in an end plate 50 (see FIG. 1) of the fuel cell 40.

The first separator 46 comprises a thin metal sheet pressed to shape. The first separator 46 has a plurality of hollow ridges 60 on a surface thereof which faces the anode electrode 4, for supplying and discharging the fuel gas to and from the anode electrode 4. The first separator 46 also has a branch groove 17 and a collection groove 18 which are defined between the first hollow ridges 60, the first gas inlet passage 11 and the first gas outlet passage 12.

Figure 3:
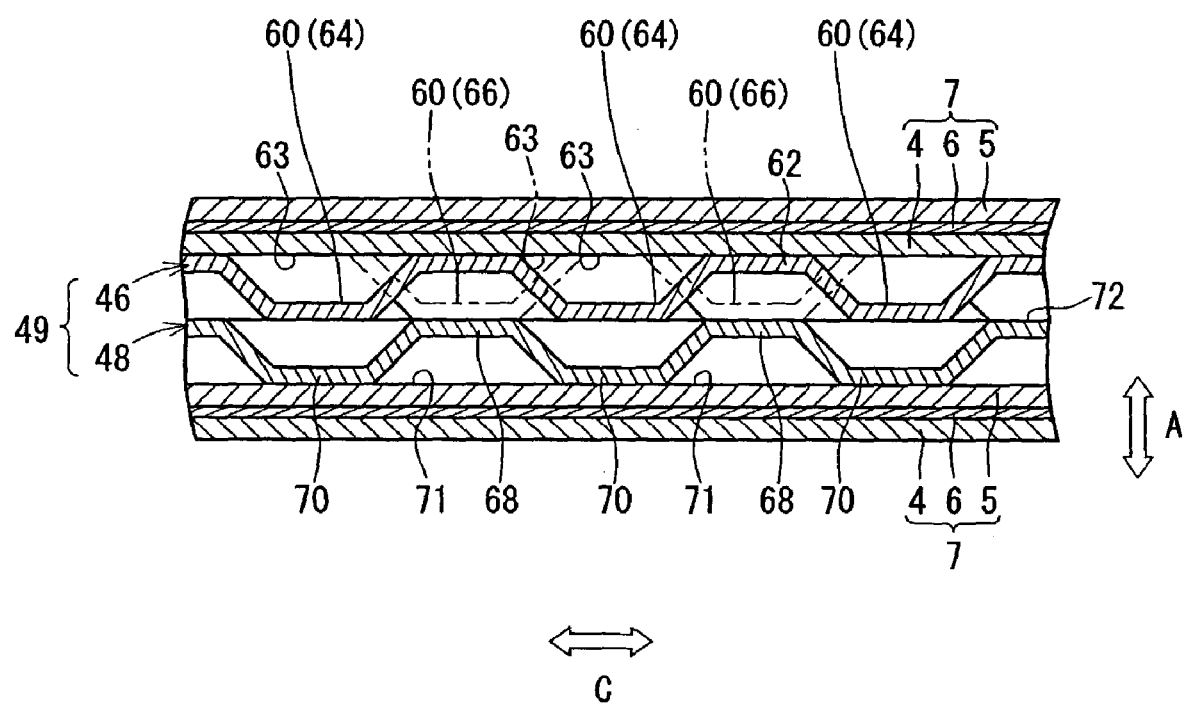
FIG. 3 is an enlarged fragmentary cross-sectional view of the stacked assembly of the fuel cell shown in FIG. 1.

FIG. 3 shows in enlarged fragmentary cross section two unit cells 42a, 42b that are stacked together. As shown in FIG. 3, the first hollow ridges 60 are successively arranged with first troughs 62 interposed therebetween and have crest surfaces projecting toward the second separator 48. Therefore, the crest surfaces of the first hollow ridges 60 are spaced from the anode electrode 4, providing hollow spaces 63 between the first hollow ridges 60 and the anode electrode 4. The fuel gas flows through the hollow spaces 63. The first troughs 62 have bottom surfaces in contact with the anode electrode 4.

Figure 4:
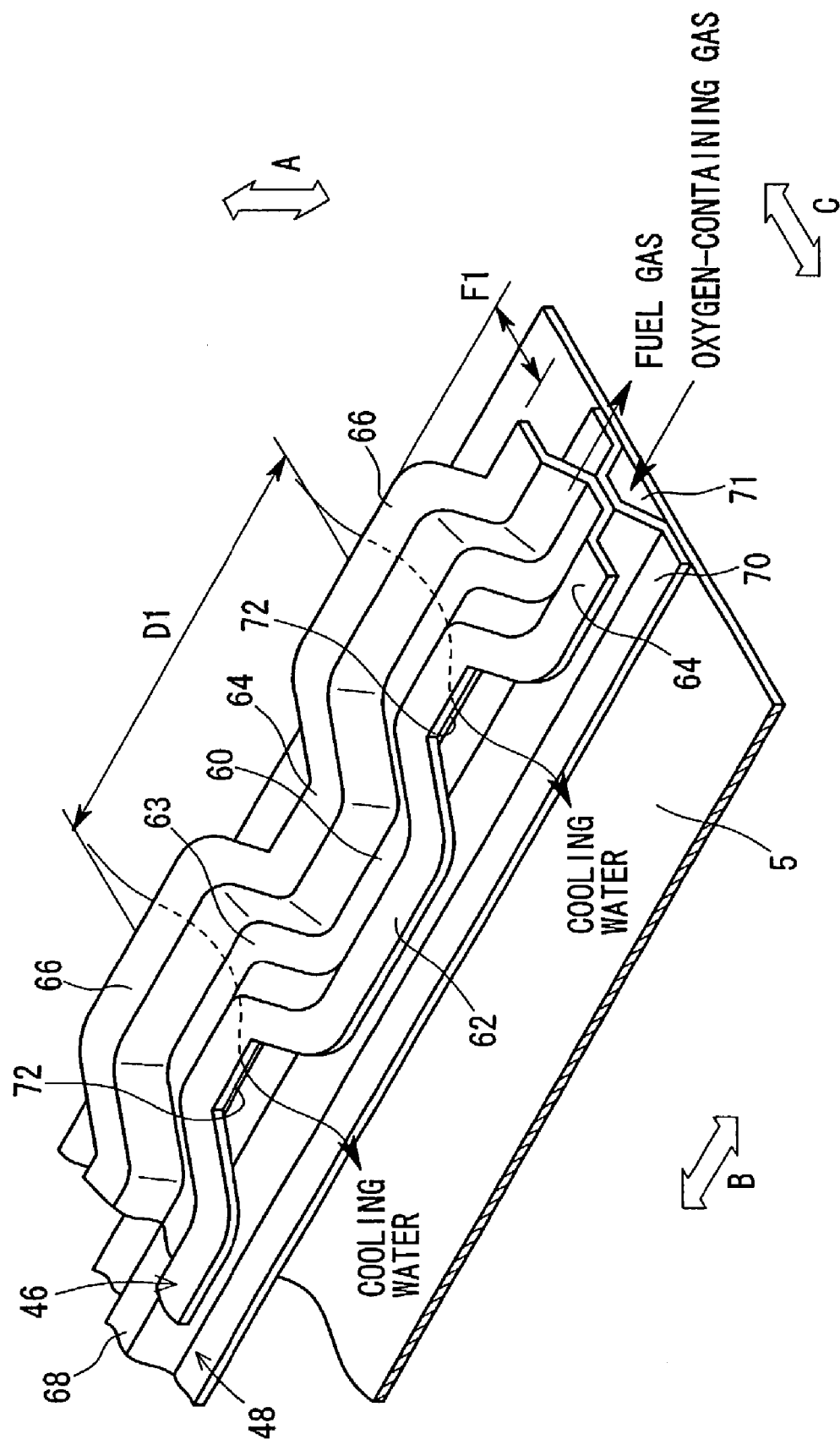
FIG. 4 is a fragmentary perspective view of a first separator stacked on a second separator in the fuel cell shown in FIG. 1.

As shown in FIGS. 2 and 4, each of the first hollow ridges 60 is bent at regular intervals by a predetermined amplitude F1 across the direction in which the fuel gas flows. Stated otherwise, each of the first hollow ridges 60 has alternate straight sections 64 and bent sections 66, and extends in a tortuous pattern from the branch groove 17 to the collection groove 18.

The bent sections 66 have respective tops whose centers are spaced by constant distances D1. Adjacent ones of the bent sections 66 are thus spaced from each other by the distance D1. The distance between the centers of the tops of adjacent ones of the bent sections 66 will be referred to as a pitch.

The second separator 48 comprises a thin metal sheet pressed to shape. The second separator 48 has a plurality of hollow ridges 68 on a surface thereof which faces the cathode electrode 5, for supplying and discharging the oxygen-containing gas to and from the cathode electrode 5. The second separator 48 also has a branch groove 19 and a collection groove 20 (see FIG. 2) which are defined between the second hollow ridges 68, the second gas inlet passage 13, and the second gas outlet passage 14.

As shown in FIG. 3, the second hollow ridges 68 are successively arranged with second troughs 70 interposed therebetween and have crest surfaces projecting toward the first separator 46. Therefore, the crest surfaces of the second hollow ridges 68 are spaced from the cathode electrode 5, providing hollow spaces 71 between the second hollow ridges 68 and the cathode electrode 5. The oxygen-containing gas flows through the hollow spaces 71. The second troughs 70 have bottom surfaces in contact with the cathode electrode 5.

As shown in FIGS. 2 through 4, each of the second hollow ridges 68 extends straight along the direction in which the oxygen-containing gas flows. When the unit cells 42a, 42b are stacked together, the crest surfaces of the second hollow ridges 68 of the second separator 48 are in contact with the crest surfaces of the straight sections 64 of the first hollow ridges 60 of the first separator 46, and spaced from the bent sections 66 of the first hollow ridges 60 of the first separator 46 (see FIGS. 3 and 4). In FIG. 4, only one of the first hollow ridges 60 and one of the second hollow ridges 68 are shown.

Since the crest surfaces of the second hollow ridges 68 of the second separator 48 are spaced from the bent sections 66 of the first hollow ridges 60 of the first separator 46, the first troughs 62 of the first separator 46 and the second troughs 70 of the second separator 48 communicate with each other, providing communication passages 72 between the second separator 48 and the first separator 46 along the direction indicated by the arrow C in FIGS. 2, 3, and 4. The cooling water flows through the communication passages 72, as described later on.

As shown in FIG. 1, electrode terminals 76a, 76b having respective tabs 74a, 74b are mounted on the respective opposite ends of the stacked assembly 44, and end plates 50, 78 are also mounted on the respective opposite ends of the stacked assembly 44 with insulating plates (not shown) interposed therebetween for preventing current leaks. As described above, the end plate 50 has the fuel gas supply port 51, the fuel gas discharge port 52, the oxygen-containing gas supply port 53, the oxygen-containing gas discharge port 54, the cooling water supply port 56, and the cooling water discharge port 58.

The stacked assembly 44 has a plurality of through holes (not shown) defined therein which extend from the end plate 50 to the end plate 78. Tie rods 80 are inserted as fastening members through the respective through holes. Nuts 82 are threaded over the tie rods 80, fastening the end plates 50, 78 thereby to hold the stacked assembly 44, the electrode terminals 76a, 76b, and the end plates 50, 78 together under pressure.

A fuel gas supply source and a fuel gas retrieval mechanism (both not shown) are connected respectively to the fuel gas supply port 51 and the fuel gas discharge port 52 in the end plate 50. An oxygen-containing gas supply source and an oxygen-containing gas retrieval mechanism (both not shown) are connected respectively to the oxygen-containing gas supply port 53 and the oxygen-containing gas discharge port 54 in the end plate 50. A cooling water supply source and a cooling water retrieval mechanism (both not shown) are connected respectively to the cooling water supply port 56 and the cooling water discharge port 58 in the end plate 50.

The fuel cell 40 according to the first embodiment is basically constructed as described above. Operation and advantages of the fuel cell 40 will be described below.

For operating the fuel cell 40, the temperature of the fuel cell 40 is increased up to a predetermined temperature. Thereafter, the fuel gas such as a hydrogen-containing gas is supplied from the fuel gas supply port 51 to the fuel cell 40, the oxygen-containing gas such as air is supplied from the oxygen-containing gas supply port 53 to the fuel cell 40, and the cooling water is supplied from the cooling water supply port 56 to the fuel cell 40.

The fuel gas is introduced through the first gas inlet passage 11 into the branch groove 17 of the first separator 46, and flows through the hollow spaces 63 between the first hollow ridges 60 and the anode electrode 4. Thereafter, hydrogen contained in the fuel gas which has passed through the gas diffusion layer of the anode electrode 4 is ionized on the electrode catalyst layer according to the following formula (A), producing hydrogen ions and electrons:

$$H_2 \rightarrow 2H^+ + 2e \quad (A)$$

The hydrogen ions move through the electrolyte layer 6 to the cathode electrode 5. The electrons are extracted by an external load such as a motor of the like which is electrically connected between the anode electrode 4 and the cathode electrode 5, and utilized as a DC electric energy for energizing the external load.

The oxygen-containing gas is introduced through the second gas inlet passage 13 into the branch groove 19 of the second separator 48, and flows through the hollow spaces 71 between the second hollow ridges 68 and the cathode electrode 5. Thereafter, oxygen contained in the oxygen-containing gas which has passed through the gas diffusion layer of the cathode electrode 5 react with the hydrogen ions having passed through the electrolyte layer 6 and the electrons having reached the cathode electrode 5 from the external load, according to the following formula (B), producing water (water vapor):

$$O_2 + 4H^+ + 4e \rightarrow 2H_2O \quad (B)$$

The reactions represented by the above formulas (A), (B) generate an electromotive force, energizing the external force electrically connected to the tabs 74a, 74b of the electrode terminals 76a, 76b. The fuel gas and the oxygen-containing gas which have been used are delivered through the collection grooves 18, 20, the first gas outlet passage 12 and the second gas outlet passage 14, and the fuel gas discharge port 52 and the oxygen-containing gas discharge port 54 to the fuel gas retrieval mechanism and the oxygen-containing gas retrieval mechanism, respectively.

The cooling water introduced into the cooling water inlet passage 23 enters between the second separator 48 of the unit cell 42a and the first separator 46 of the unit cell 42b. As described above, the communication passages 72 are between the unit cells 42a, 42b by the first troughs 62 of the first separator 46 and the second troughs 70 of the second separator 48. Therefore, the cooling water which has entered between the second separator 48 and the first separator 46 flows through the communication passages 72 (see FIG. 3). Specifically, the cooling water flows through the communication passages 72, i.e., between the second separator 48 and the first separator 46, and thereafter reaches the cooling water outlet passage 24. Therefore, the end faces of the second separator 48 and the first separator 46 are sufficiently cooled by the cooling water.

With the fuel cell 40 according to the first embodiment, since the cooling water can be passed between the stacked unit cells 42a, 42b, the fuel cell 40 can be cooled efficiently. As no spacers 25 (see FIG. 14) are required to be interposed between the unit cells 42a, 42b, the weight and volume of the fuel cell 40 are not increased. Since the communication passages 72 allow the cooling water to be distributed as desired in the fuel cell 40, air bubbles introduced into the cooling water can easily be eliminated, preventing the cooling efficiency from being reduced.

Figure 12:
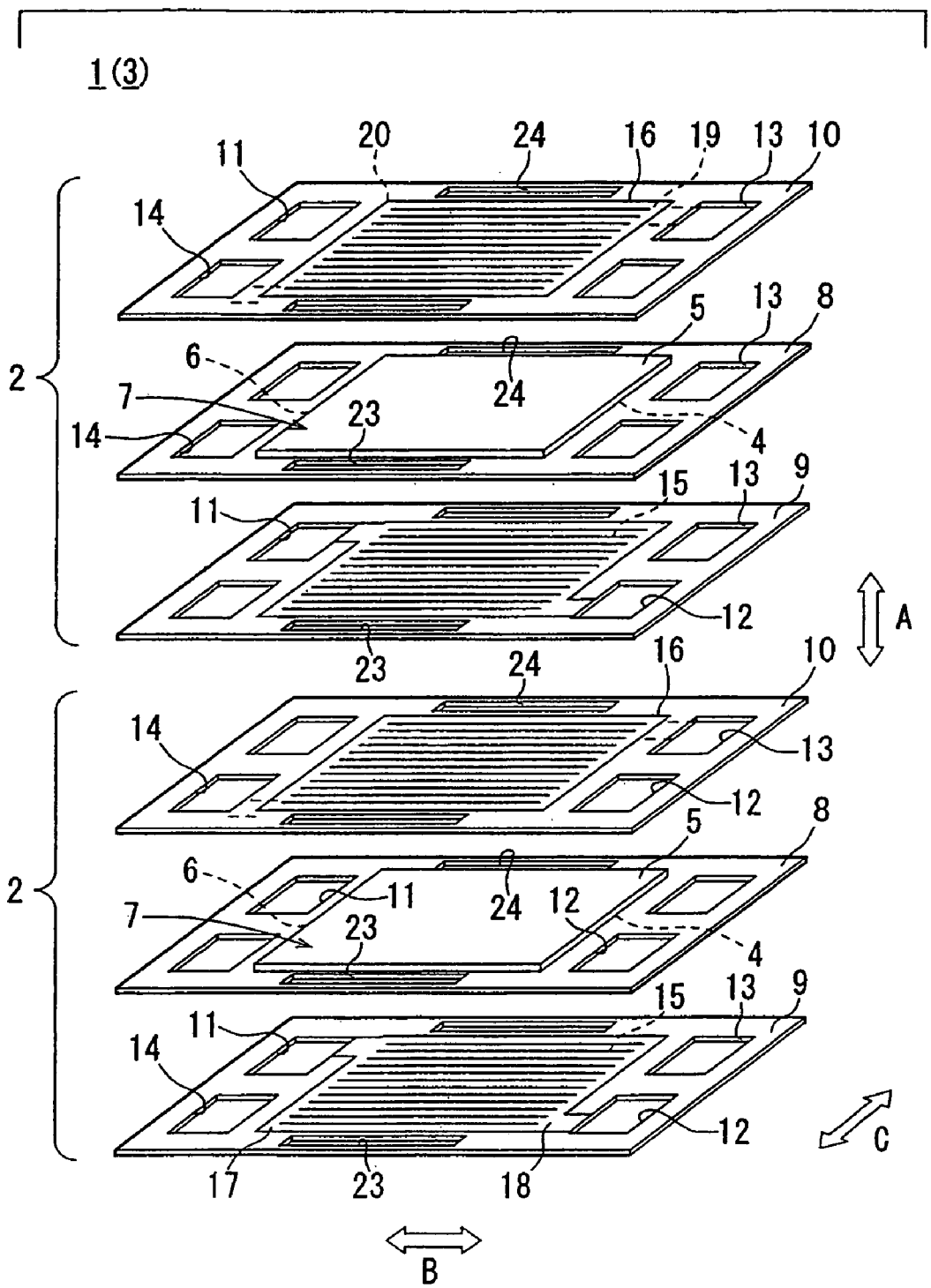
FIG. 12 is an exploded perspective view of two adjacent unit cells in a stacked assembly of a conventional fuel cell.
Figure 13:
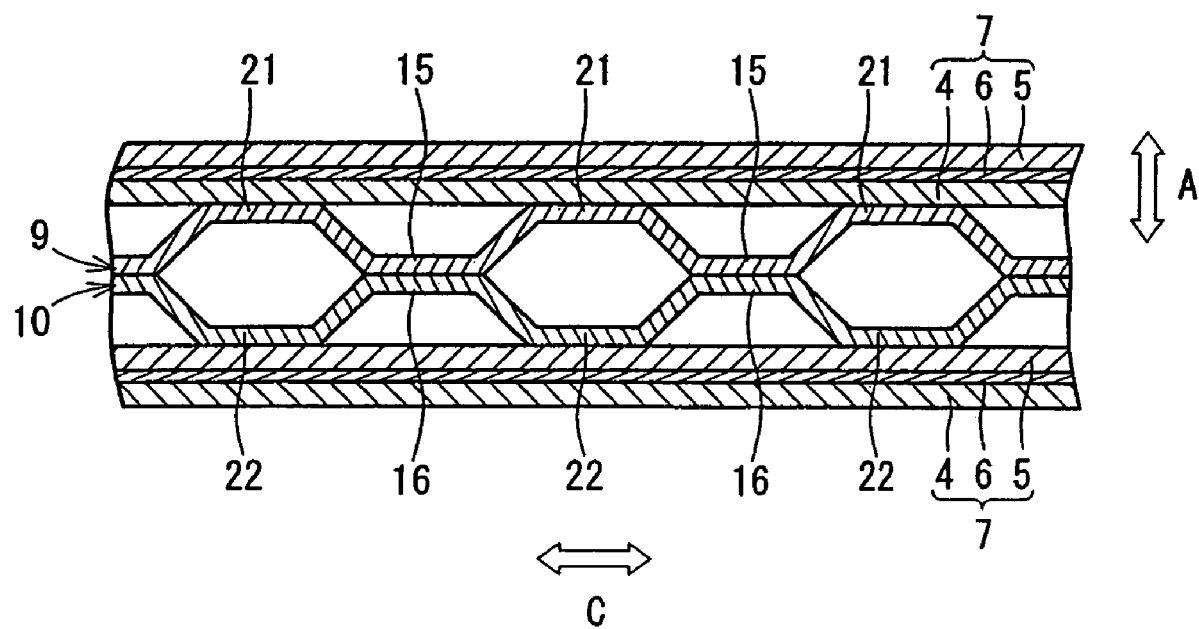
FIG. 13 is an enlarged fragmentary cross-sectional view of the stacked assembly of the conventional fuel cell shown in FIG. 12.
Figure 14:
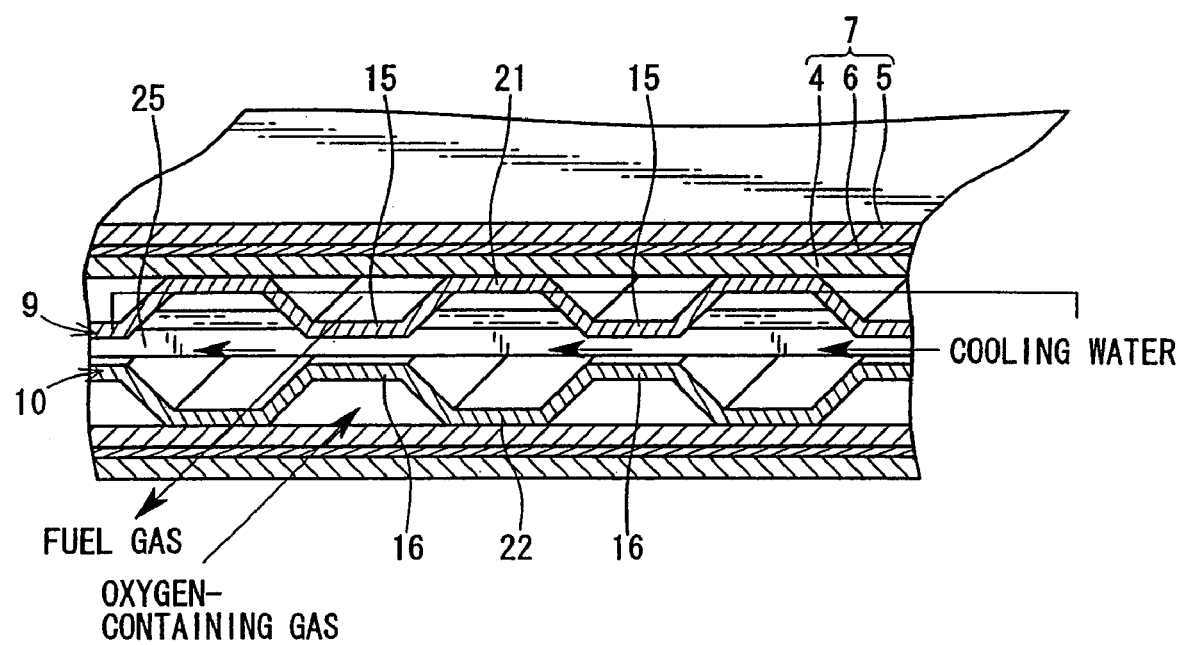
FIG. 14 is an enlarged fragmentary sectional perspective view of a stacked assembly of a fuel cell with a spacer interposed between unit cells.
Figure 15:
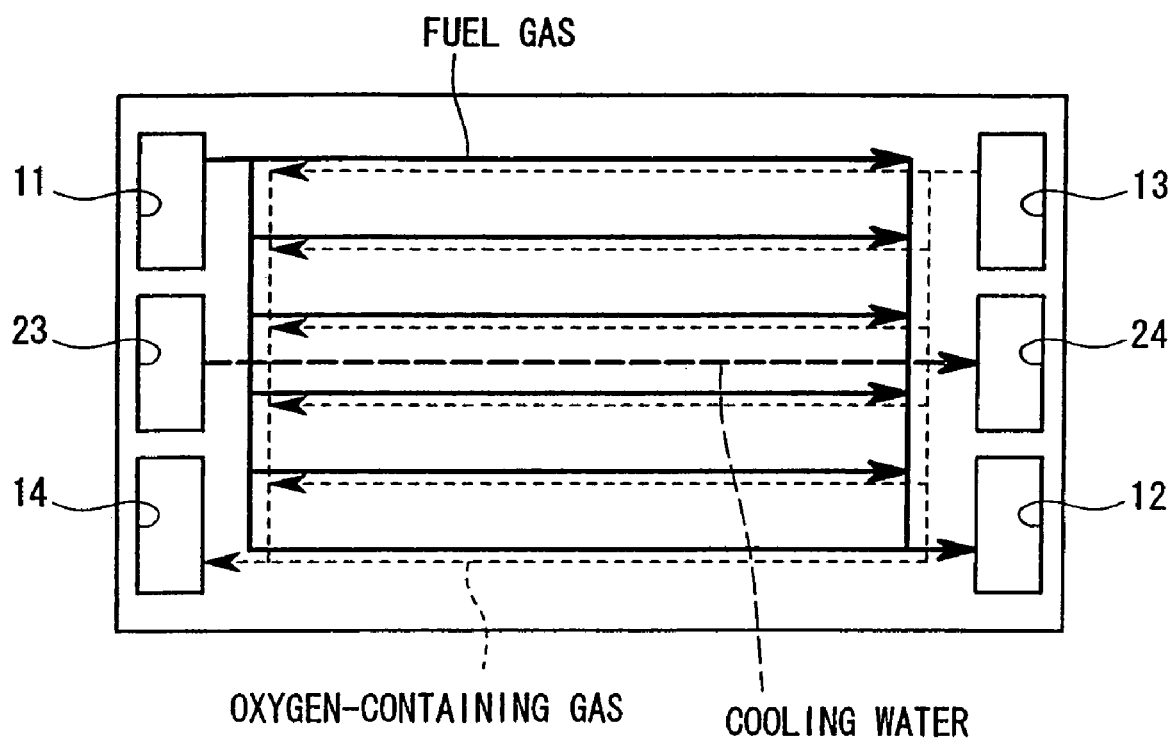
FIG. 15 is a front elevational view of a stacked assembly having a cooling water inlet passage and a cooling water outlet passage which are lined up with a first gas inlet passage and a second gas outlet passage, and a first gas outlet passage and a second gas inlet passage.
Figure 16:
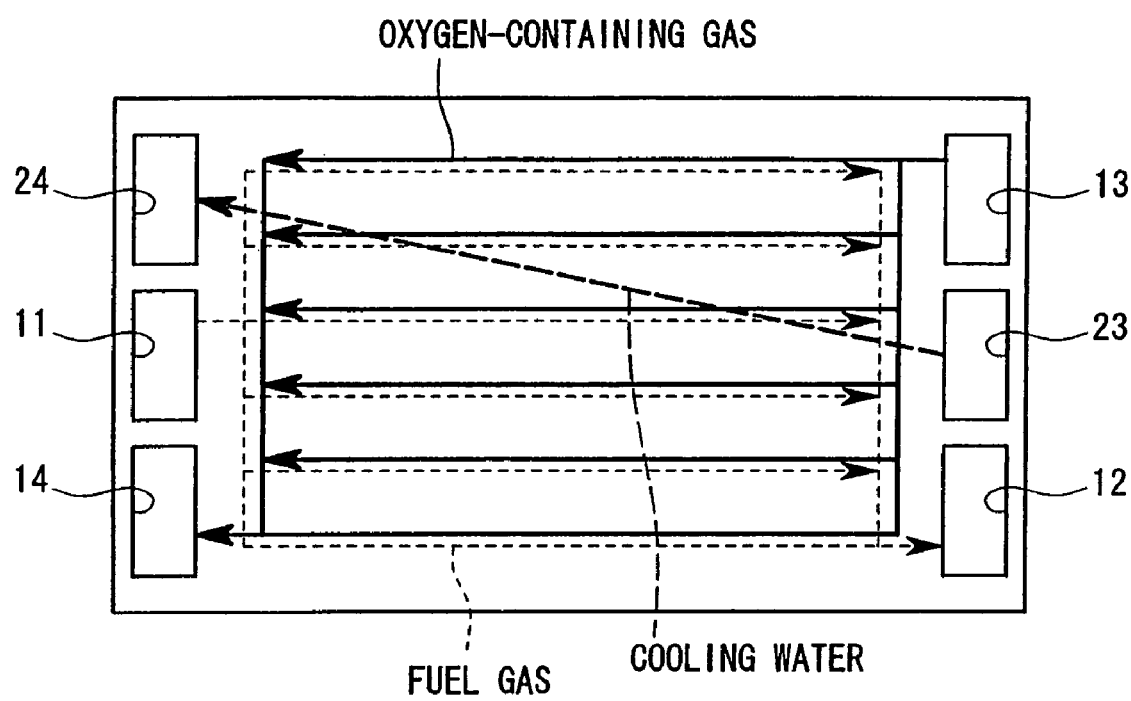
FIG. 16 is a front elevational view of a stacked assembly having a cooling water inlet passage and a cooling water outlet passage which are lined up with a first gas inlet passage and a second gas outlet passage, and a first gas outlet passage and a second gas inlet passage, the cooling water inlet passage and the cooling water outlet passage being disposed in positions different from those shown in FIG. 15.

The cross-sectional areas of the passages 11, 12, 13, 14, 23, 24 do not need to be changed from those in the fuel cell 1 shown in FIG. 12. Consequently, the fuel gas and the oxygen-containing gas flow at the same rates as those with the fuel cell 1. Accordingly, the fuel cell 40 has its power generating efficiency kept at a desired level. The layout of the passages 11, 12, 13, 14, 23, 24 is given desired freedom.

The first hollow ridges which extend straight may be provided on the first separator, and the second hollow ridges which have bent sections may be provided on the second separator to give the same phenomena and advantages as described above.

A fuel cell according to a second embodiment of the present invention will be described below with reference to FIGS. 5 through 7. Those parts of the fuel cell according to the second embodiment which are identical to those of the fuel cell according to the first embodiment shown in FIGS. 1 through 4 are denoted by identical reference characters, and will not be described in detail below.

Figure 5:
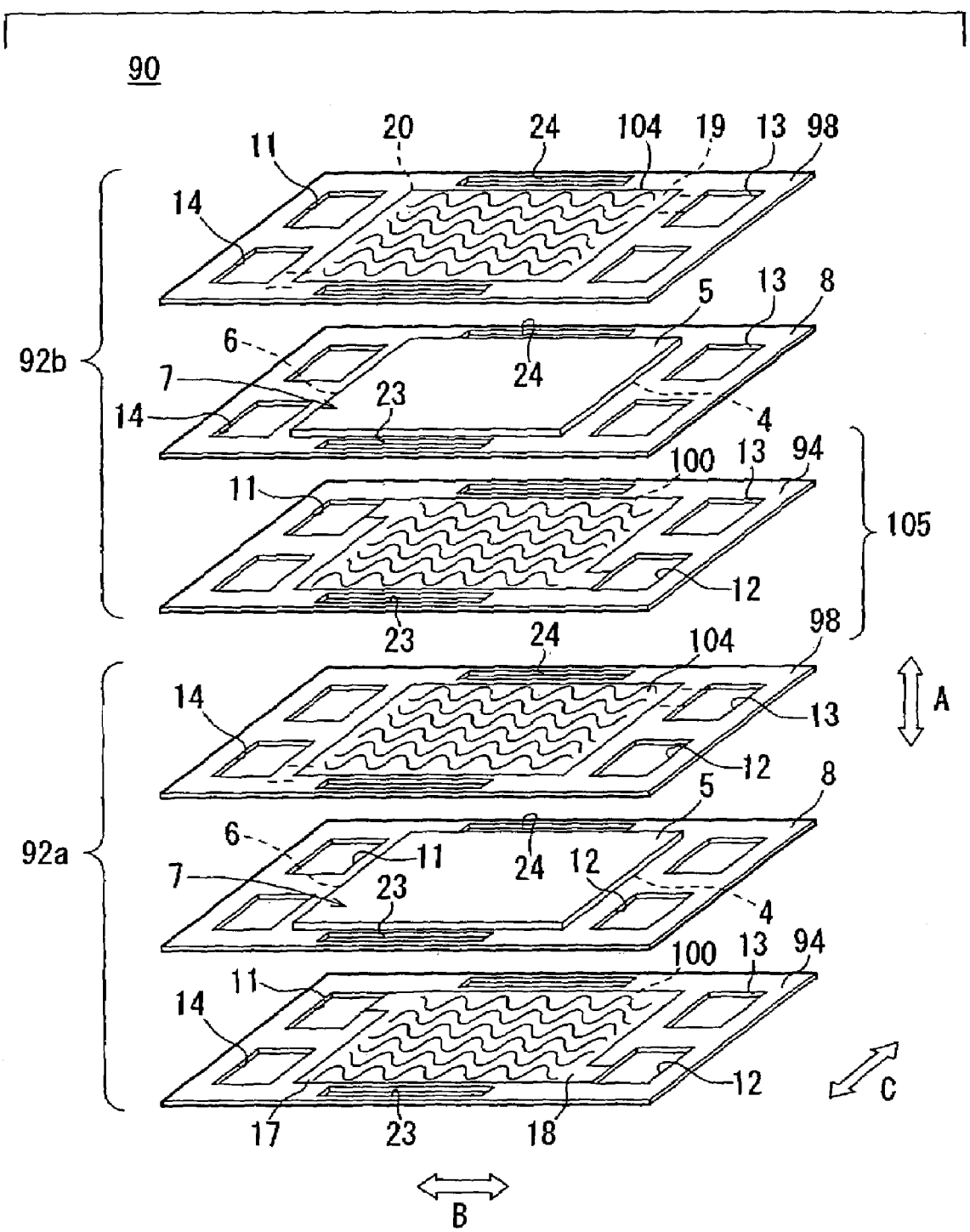
FIG. 5 is an exploded perspective view of two adjacent unit cells in a stacked assembly of a fuel cell according to a second embodiment of the present invention.

As shown in FIG. 5, the fuel cell according to the second embodiment includes a stacked assembly 90 having a plurality of unit cells 92a, 92b electrically connected in series with each other and stacked in the direction indicated by the arrow A in FIG. 5. Though the unit cells 92a, 92b are structurally identical to each other, they are denoted by different reference characters for illustrative purposes.

Figure 6:
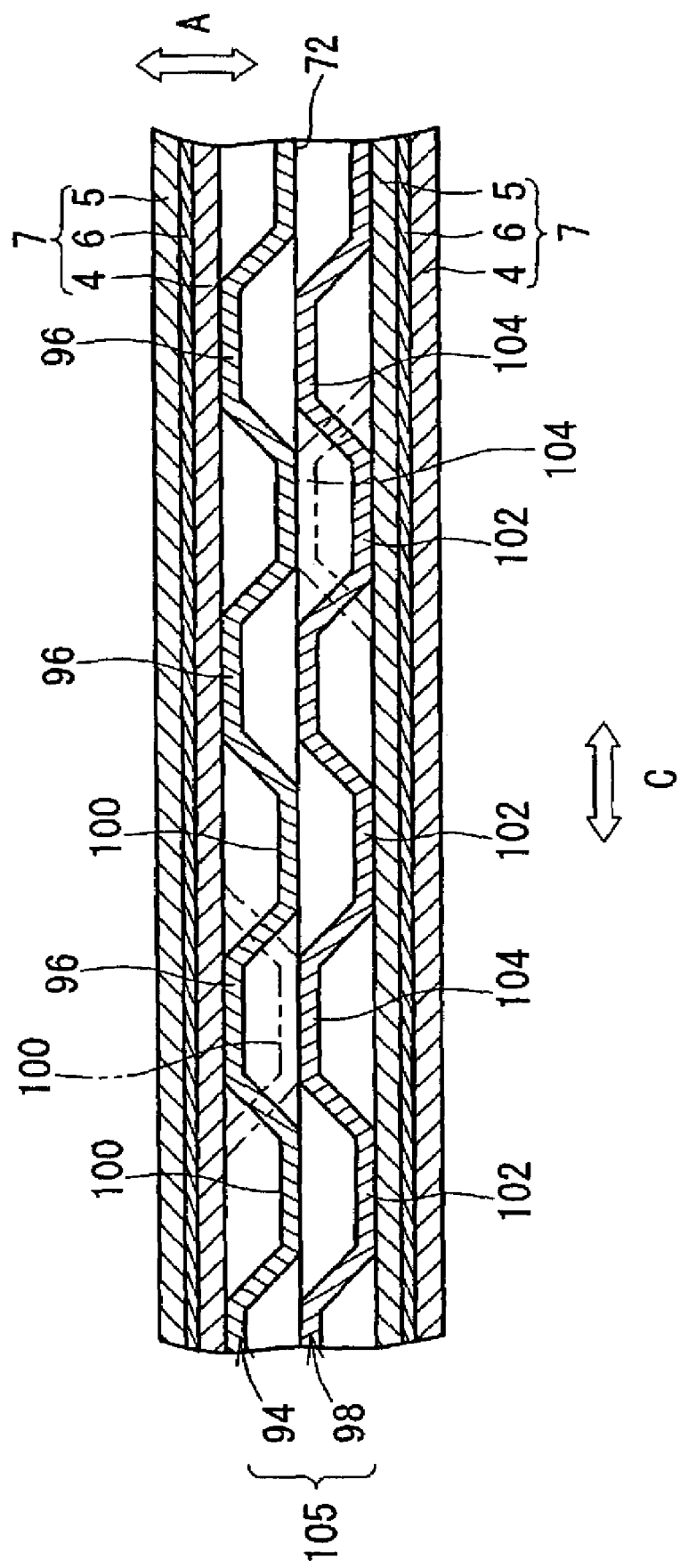
FIG. 6 is an enlarged fragmentary cross-sectional view of the stacked assembly of the fuel cell according to the second embodiment.

FIG. 6 shows in enlarged fragmentary cross section two unit cells 92a, 92b that are stacked together. As shown in FIG. 6, the first separator 94 has a plurality of first hollow ridges 100 which are successively arranged with first troughs 96 interposed therebetween and have crest surfaces projecting toward the second separator 98.

Figure 7:
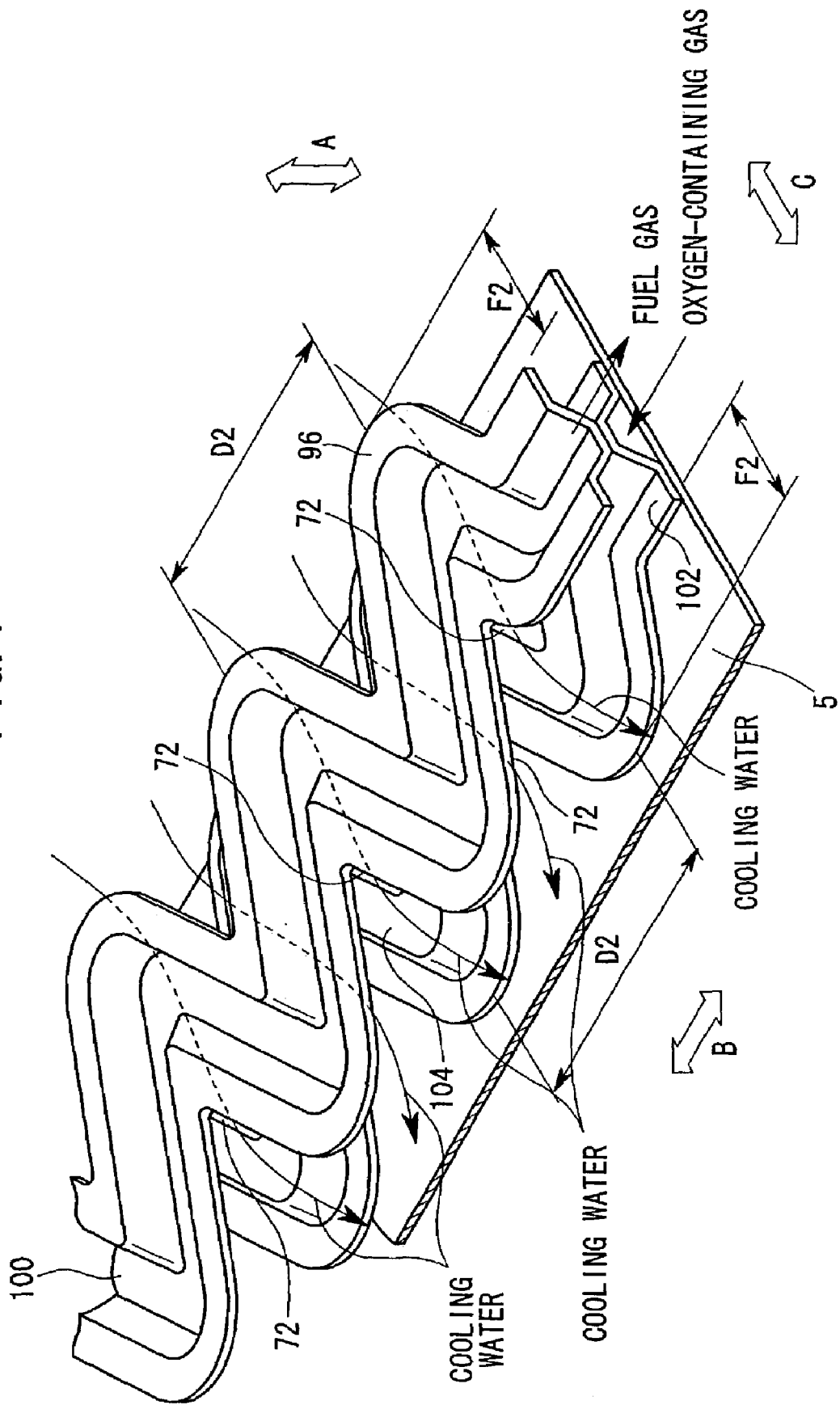
FIG. 7 is a fragmentary perspective view of a first separator stacked on a second separator in the fuel cell according to the second embodiment.

As shown in FIGS. 5 and 7, each of the first hollow ridges 100 is of a sine-wave shape which is bent at regular intervals by a predetermined amplitude F2. The first hollow ridges 100 have a pitch D2 for all the bent sections thereof.

The second separator 98 has a plurality of second hollow ridges 104 which are successively arranged with second troughs 102 interposed therebetween and have crest surfaces projecting toward the first separator 94 (see FIG. 6). The second separator 98 and the first separator 94 jointly make up a separator unit 105.

Each of the second hollow ridges 104 is of a sine-wave shape which is bent at regular intervals by the predetermined amplitude F2 and has the pitch D2, as with the first hollow ridges 100. However, the second hollow ridges 104 are out of phase with the first hollow ridges 100, i.e., are staggered with respect to the first hollow ridges 100. The crest surfaces of the second hollow ridges 104 and the crest surfaces of the first hollow ridges 100 are in contact with each other in regions where they cross each other, and are spaced from each other in other regions where they do not cross each other. The crest surfaces of the second hollow ridges 104 and the crest surfaces of the first hollow ridges 100 which are spaced from each other allow the first troughs 96 and the second troughs 102 to communication with each other, providing communication passages 72 for the cooling water to flow therethrough.

In the second embodiment, both the first hollow ridges 100 and the second hollow ridges 104 are bent to a meandering pattern to allow the cooling water that has entered between the unit cells 92a, 92b to flow in the direction indicated by the arrow C. Because the communication passages 72 are provided by the first hollow ridges 100 and the second hollow ridges 104 which are bent, the cooling water can flow at a higher rate than with the fuel cell 40 according to the first embodiment. Therefore, the cooling water efficiency of the fuel cell according to the second embodiment is higher.

Figure 8:
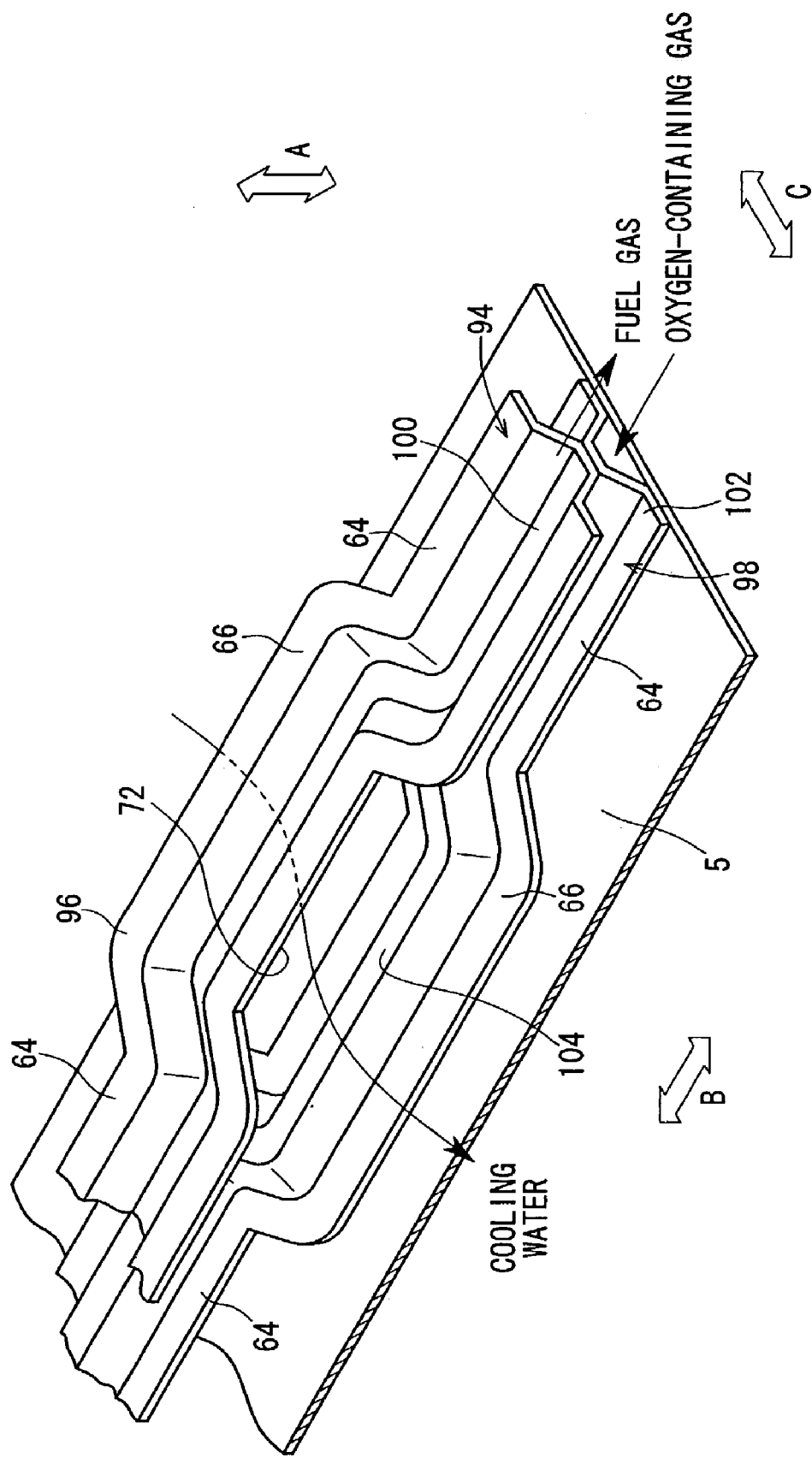
FIG. 8 is a fragmentary perspective view of a first separator stacked on a second separator in a stacked assembly of a fuel cell according to a modification of the second embodiment.

In the second embodiment, the first hollow ridges 100 and the second hollow ridges 104 may not necessarily be of a sine-wave shape, but may have alternate straight sections 64 and bent sections 66 as shown in FIG. 8.

Figure 9:
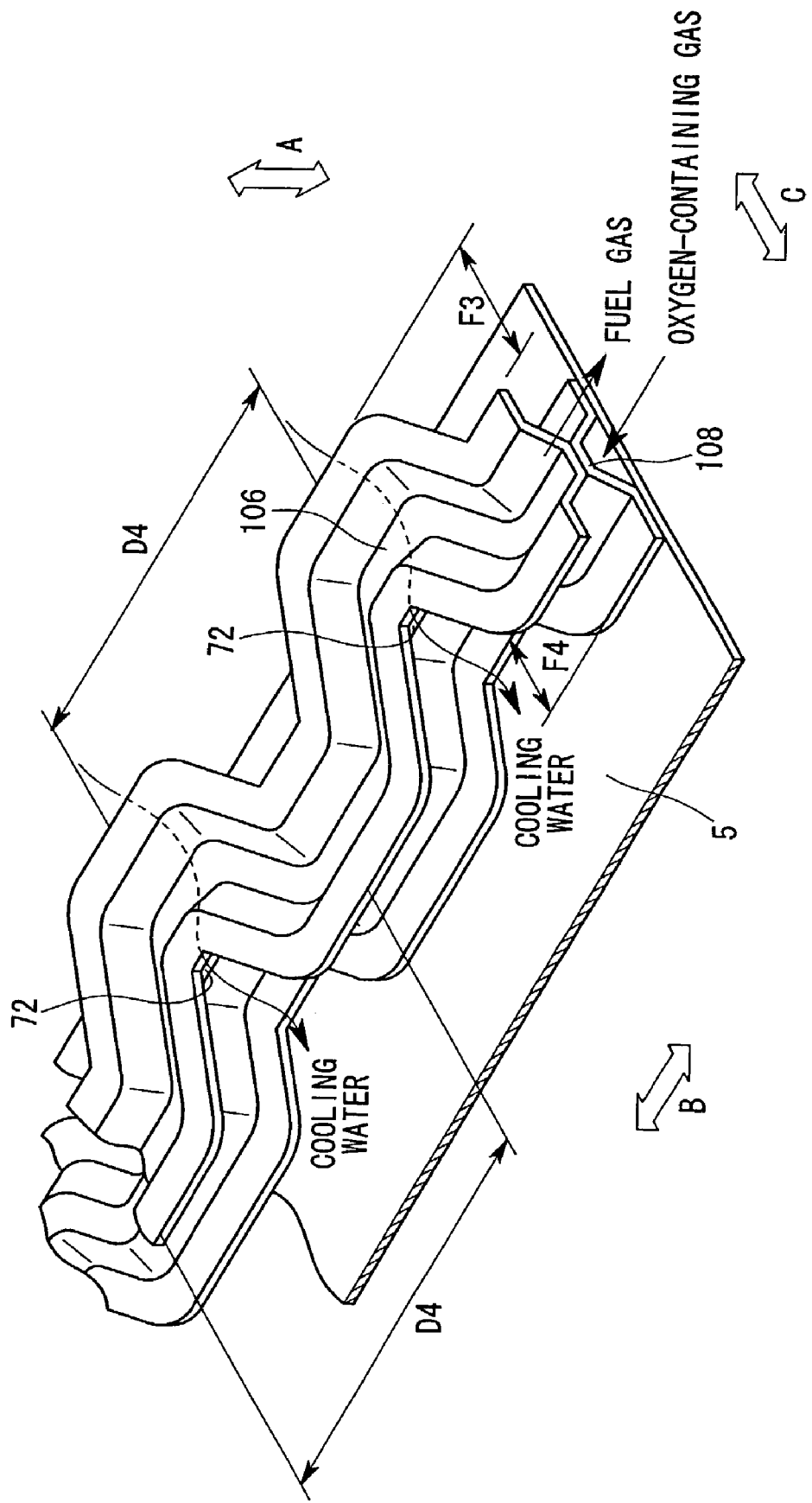
FIG. 9 is a fragmentary perspective view of a first separator stacked on a second separator in a stacked assembly of a fuel cell according to a third embodiment of the present invention.

The amplitudes and pitches of the first hollow ridges and the second hollow ridges may be selected such that the first troughs and the second troughs can communicate with each other, providing the communication passages 72. For example, as shown in FIG. 9, a first hollow ridge 106 and a second hollow ridge 108 may have a common pitch D4, the first hollow ridge 106 may have an amplitude F3, and the second hollow ridge 108 may have an amplitude F4 slightly smaller than the amplitude F3, thus providing communication passages 72.

Figure 10:
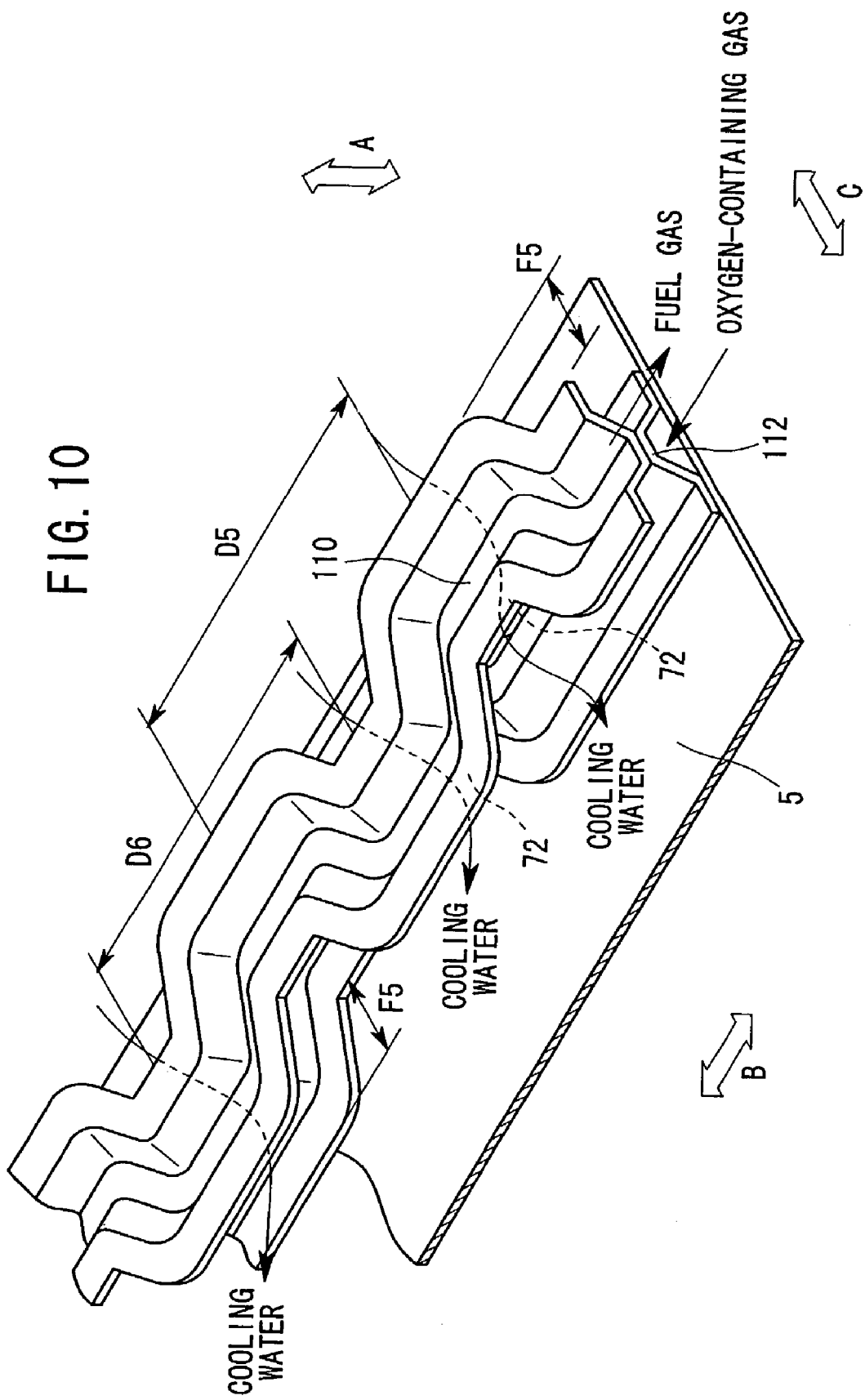
FIG. 10 is a fragmentary perspective view of a first separator stacked on a second separator in a stacked assembly of a fuel cell according to a fourth embodiment of the present invention.

Alternatively, as shown in FIG. 10, a first hollow ridge 110 and a second hollow ridge 112 may have a common amplitude F5, the first hollow ridge 110 may have a pitch D5, and the second hollow ridge 112 may have a pitch D6 slightly greater than the pitch D5, thus providing communication passages 72.

Figure 11:
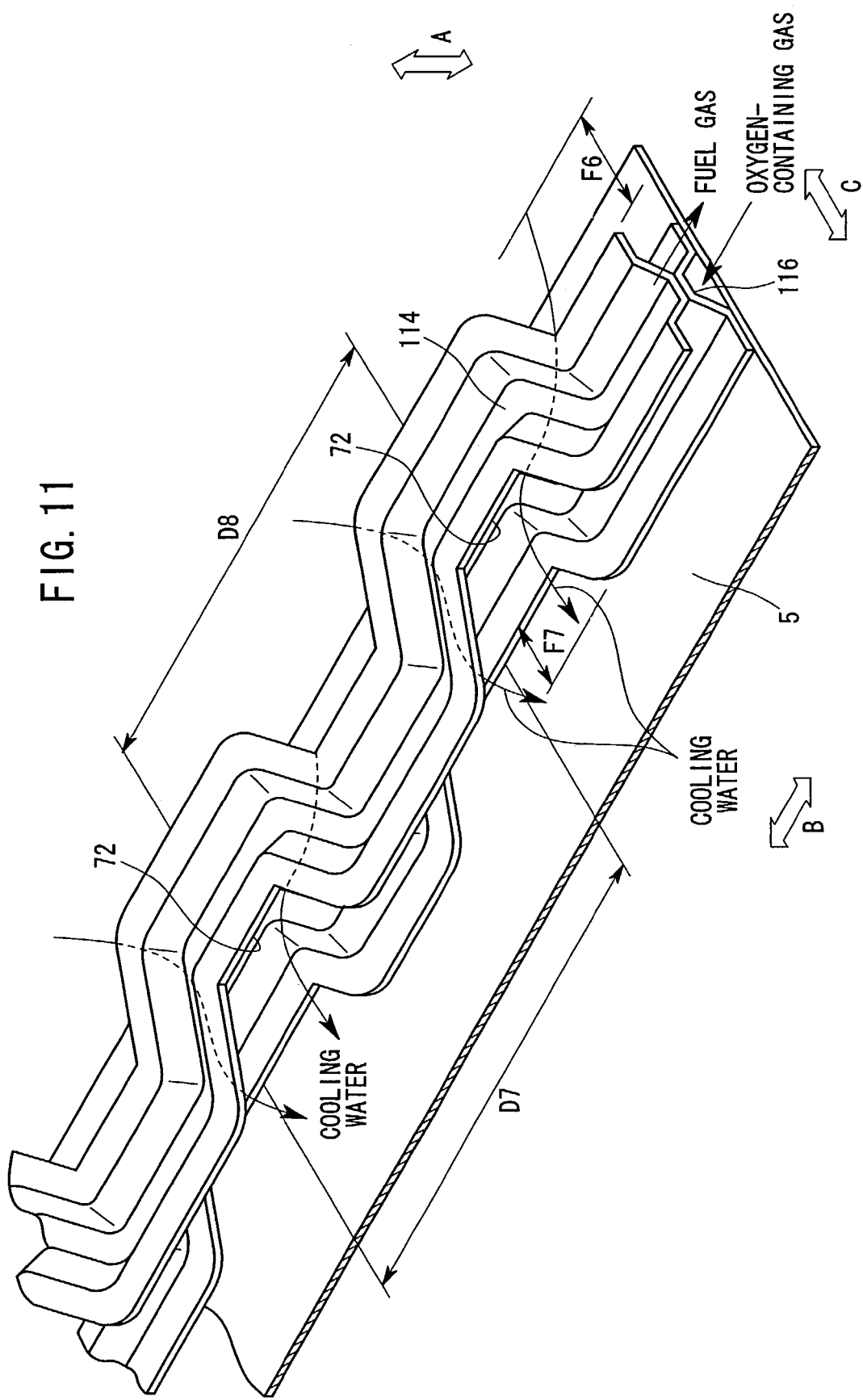
FIG. 11 is a fragmentary perspective view of a first separator stacked on a second separator in a stacked assembly of a fuel cell according to a fifth embodiment of the present invention.

Further alternatively, as shown in FIG. 11, a first hollow ridge 114 may have an amplitude F6, a second hollow ridge 116 may have an amplitude F7 slightly smaller than the amplitude F6, the first hollow ridge 114 may have a pitch D7, and the second hollow ridge 116 may have a pitch D8 slightly smaller than the pitch D7, thus providing communication passages 72.

Either one of the first hollow ridges 106, 110, 114 or either one of the second hollow ridges 108, 112, 116 may have a sine-wave shape. Alternatively, these first hollow ridges and the second hollow ridges may be out of phase with each other.

The rate at which the cooling water flows can be adjusted by thus selecting the shapes of the first hollow ridges and the second hollow ridges. A single fuel cell may have a pattern of first and second hollow ridges for supplying the cooling water at a larger rate to those unit cells which require more cooling and another pattern of first and second hollow ridges for supplying the cooling water at a smaller rate to those unit cells which require less cooling. In this manner, the fuel cell has different cooling efficiencies for different regions or unit cells therein.

In each of the above embodiments, cooling water is illustrated as the coolant for cooling the fuel cell. However, another fluid such as ethylene glycol, oil, or the like may be used as the coolant.

Although certain preferred embodiments of the present invention have been shown and described in detail, it should be understood that various changes and modifications may be made therein without departing from the scope of the appended claims.

What is claimed is:

1. A fuel cell comprising:
 a stacked assembly having a plurality of stacked unit cells each having an electrolyte electrode assembly comprising an anode electrode, a cathode electrode, and an electrolyte layer interposed between said anode electrode and said cathode electrode, and first and second separators sandwiching said electrolyte electrode assembly;
 said first separator having hollow spaces for passing therethrough a fuel gas supplied to said anode electrode and a plurality of elongate first hollow ridges with first troughs interposed therebetween, the first hollow ridges creating a fuel gas flow path;
 said second separator having hollow spaces for passing therethrough an oxygen-containing gas supplied to said cathode electrode and a plurality of elongate second hollow ridges with second troughs interposed therebetween, said second hollow ridges extending in the same direction as said first hollow ridges, the second hollow ridges creating an oxygen-containing gas flow path;
 at least one of said first hollow ridges or said second hollow ridges having bent sections bent across the direction in which said fuel gas or said oxygen-containing gas flows causing the fuel gas flow path and the oxygen-containing gas flow path to cross each other where the first hollow ridges and the second hollow ridges contact each other and creating spaces between portions of crest surfaces of said first hollow ridges and portions of crest surfaces of said second hollow ridges from each other, and the crest surfaces of said first hollow ridges and the crest surfaces of said second hollow ridges face each other and are disposed adjacent to each other between the electrolyte electrode assemblies of said stacked assembly;
 said first troughs and said second troughs communicating with each other through said spaces between portions of the crest surfaces of said first hollow ridges and the crest surfaces of said second hollow ridges, so that a coolant can flow through said first troughs and said second troughs which communicate with each other.

2. A fuel cell according to claim 1, wherein both said first hollow ridges and said second hollow ridges have bent sections, the bent sections of said first hollow ridges and the bent sections of said second hollow ridges have the same amplitude as each other, and include adjacent bent sections spaced from each other by the same distance, and the bent sections of said first hollow ridges and the bent sections of said second hollow ridges are positioned out of phase with each other.

3. A fuel cell according to claim 1, wherein both said first hollow ridges and said second hollow ridges have bent sections, the bent sections of said first hollow ridges and the bent sections of said second hollow ridges include adjacent bent sections spaced from each other by the same distance, and the bent sections of said first hollow ridges and the bent sections of said second hollow ridges have different amplitudes.

4. A fuel cell according to claim 1, wherein both said first hollow ridges and said second hollow ridges have bent sections, the bent sections of said first hollow ridges and the bent sections of said second hollow ridges have the same amplitude as each other, either the bent sections of said first hollow ridges or the bent sections of said second hollow ridges include adjacent bent sections spaced from each other by a first distance, and the other bent sections include adjacent bent sections spaced from each other by a second distance different from said first distance.

5. A fuel cell according to claim 1, wherein both said first hollow ridges and said second hollow ridges have bent sections, the bent sections of said first hollow ridges and the bent sections of said second hollow ridges have different amplitudes, and include adjacent bent sections spaced from each other by different distances.

6. A fuel cell according to claim 1, wherein at least one of said first hollow ridges and said second hollow ridges is bent to a sine-wave shape along the direction in which the fuel gas or the oxygen-containing gas flows.

7. A separator unit in a fuel cell having a first unit cell and a second unit cell disposed adjacent thereto, each of said unit cells having an electrolyte electrode assembly comprising an anode electrode, a cathode electrode, and an electrolyte layer interposed between said anode electrode and said cathode electrode, and first and second separators sandwiching said electrolyte electrode assembly, said separator unit comprising said first separator in said first unit cell and said second separator in said first unit cell;

said first separator having hollow spaces for passing therethrough a fuel gas supplied to said anode electrode and a plurality of elongate first hollow ridges with first troughs interposed therebetween, the first hollow ridges creating a fuel gas flow path;

said second separator having hollow spaces for passing therethrough an oxygen-containing gas supplied to said cathode electrode and a plurality of elongate second hollow ridges with second troughs interposed therebetween, said second hollow ridges extending in the same direction as said first hollow ridges, the second hollow ridges creating an oxygen-containing gas flow path;

at least one of said first hollow ridges or said second hollow ridges having bent sections bent across the direction in which said fuel gas or said oxygen-containing gas flows causing the fuel gas glow path and the oxygen-containing gas flow path to cross each other where the first hollow ridges and the second hollow ridges contact each other and creating spaces between portions of crest surfaces of said first hollow ridges and portions of crest surfaces of said second hollow ridges from each other, and the crest surfaces of said first hollow ridges and the crest surfaces of said second hollow ridges face each other and are disposed adjacent to each other between the electrolyte electrode assemblies of said stacked assembly;

said first troughs and said second troughs communicating with each other through said spaces between portions of the crest surfaces of said first hollow ridges and the crest surfaces of said second hollow ridges, so that a coolant can flow through said first troughs and said second troughs which communicate with each other.

8. A separator unit according to claim 7, wherein both said first hollow ridges and said second hollow ridges have bent sections, the bent sections of said first hollow ridges and the bent sections of said second hollow ridges have the same amplitude as each other, and include adjacent bent sections spaced from each other by the same distance, and the bent sections of said first hollow ridges and the bent sections of said second hollow ridges are positioned out of phase with each other.

9. A separator unit according to claim 7, wherein both said first hollow ridges and said second hollow ridges have bent sections, the bent sections of said first hollow ridges and the bent sections of said second hollow ridges include adjacent bent sections spaced from each other by the same distance, and the bent sections of said first hollow ridges and the bent sections of said second hollow ridges have different amplitudes.

10. A separator unit according to claim 7, wherein both said first hollow ridges and said second hollow ridges have bent sections, the bent sections of said first hollow ridges and the bent sections of said second hollow ridges have the same amplitude as each other, either the bent sections of said first hollow ridges or the bent sections of said second hollow ridges include adjacent bent sections spaced from each other by a first distance, and the other bent sections include adjacent bent sections spaced from each other by a second distance different from said first distance.

11. A separator unit according to claim 7, wherein both said first hollow ridges and said second hollow ridges have bent sections, the bent sections of said first hollow ridges and the bent sections of said second hollow ridges have different amplitudes, and include adjacent bent sections spaced from each other by different distances.

12. A separator unit according to claim 7, wherein at least one of said first hollow ridges and said second hollow ridges is bent to a sine-wave shape along the direction in which the fuel gas or the oxygen-containing gas flows.

* * * * *